United States Patent [19]

Holtz

[11] 3,899,537

[45] Aug. 12, 1975

[54] PRODUCING BENZOPHENONE AND RELATED PRODUCTS

[75] Inventor: Hans D. Holtz, Bartlesville, Okla.

[73] Assignee: Phillips Petroleum Company, Bartlesville, Okla.

[22] Filed: July 12, 1972

[21] Appl. No.: 271,031

[52] U.S. Cl.................. 260/591; 260/487; 260/599
[51] Int. Cl...................... C07c 49/76; C07c 45/04
[58] Field of Search..................... 260/591, 517, 599

[56] References Cited
UNITED STATES PATENTS

| | | | |
|---|---|---|---|
| 3,201,476 | 8/1965 | Baker et al...................... | 260/597 R |
| 3,496,197 | 2/1970 | Rheenen............................ | 260/591 |
| 3,665,030 | 5/1972 | Radzitzky.......................... | 260/599 |
| 3,694,500 | 9/1972 | Weinstein et al............... | 260/524 R |

OTHER PUBLICATIONS

Hawkins et al., "Journal of Applied Chemistry," Vol. 6, Jan. 6, 1956, pp. 1–11.
Awasthy et al., "J.A.C.S.," 91:4/Feb. 12, 1969, pp., 991–996.
Zahees et al. "Chem. Abstracts," Vol. 50, Mar. 25, 1956, 4862(d) at 4863(b).
Berti et al. "Chem. Abst.," Vol. 54, 11–60, 24542(a) at 24542(e).
Bridson-Jones, "Chem. Abstract," Vol. 46, Oct. 10, 1952, 9053(g) at 9054(g).
Maruyama et al. "Chem. Abst.," Vol. 56, Feb. 5, 1962, 2399(i).

*Primary Examiner*—Anton H. Sutto
*Assistant Examiner*—Richard D. Kelly

[57] ABSTRACT

A stilbene, e.g., cis- and/or trans-stilbene or a substituted stilbene, is oxidized at an elevated temperature to produce benzophenone and a related product. Diphenylacetaldehyde, also produced, can be converted under the conditions of the invention to produce additional benzophenone.

The reaction is effected at a temperature in the approximate range 50°–600°F, preferably 200°–400°F under a pressure of oxygen of from about 1 to 500 psig, preferably 20 to about 200 psig.

A solvent, e.g., a carboxylic acid for example acetic acid or a halogenated compound for example chlorobenzene is employed. Also, a catalyst, e.g., trifluoroacetic acid and/or trichloroacetic acid can be employed. Further a cocatalyst which is an organic compound of a transition metal, e.g., cobalt acetylacetonate or vanadium naphthenate can also be employed.

New compounds, e.g., hydrobenzoin monotrifluoroacetate, hydrobenzoin bistrifluoroacetate, benzoin trifluoroacetate are produced by the process of the invention.

11 Claims, No Drawings

PRODUCING BENZOPHENONE AND RELATED PRODUCTS

This invention relates to the production of benzophenone. It also relates to the production of novel products, e.g., hydrobenzoin monotrifluoroacetate, hydrobenzoin bistrifluoroacetate and benzoin trifluoroacetate. In one of its aspects it relates to the production of benzophenone from a stilbene by an oxidation process. Further, the invention relates to the conversion of diphenylacetaldehyde to benzophenone.

In one of its concepts the invention provides a process for the conversion of a stilbene to benzophenone and to a related product as herein described by oxidizing the stilbene with oxygen at an elevated temperature preferably under pressure. In another of its concepts, the invention provides a process, as described, wherein the oxidation is effected in a carboxylic acid solvent such as acetic acid. In a still further concept of the invention, the oxidation is effected in the presence of a halogenated carboxylic acid such as trifluoroacetic acid and/or trichloroacetic acid. Further still another concept of the invention provides a process, as described, wherein an organic compound of a transition metal for example, a naphthenate or acetylacetonate is employed as a cocatalyst.

I have discovered that benzophenone and related products can be produced from stilbene under conditions of oxidation as herein described at an elevated temperature now preferred to be in the approximate range 200°–400°F with oxygen, now preferred to be under a pressure at least at the initiation of the operation, when conducted in a batchwise or continuous operation, of from about 20 psig to about 200 psig or somewhat higher.

The conversion of stilbene, in which the phenyl groups are on different carbon atoms, by the present oxidative process to benzophenone is indeed surprising and unexpected. Further, the conversion of diphenylacetaldehyde to benzophenone under the conditions of the invention is also unexpected.

An object of the invention is to produce benzophenone. Another object of the invention is to produce hydrobenzoin monotrifluoroacetate, hydrobenzoin bistrifluoroacetate and benzoin trifluoroacetate. A further object of the invention is to provide a process for the oxidation of a stilbene. Still another object of the invention is to provide a process for the conversion of a stilbene to benzophenone and a related product in the presence of a catalyst. A further object still of the invention is to provide a solvent for the reaction or reactions involved. Still another object of the invention is to provide a catalytic oxidation of stilbene to produce benzophenone and other products, as herein described, employing a cocatalyst.

According to the present invention a stilbene is oxidized with oxygen, preferably under pressure, and at an elevated temperature to produce benzophenone, benzaldehyde, benzoic acid and diphenylacetaldehyde. Also according to the invention, diphenylacetaldehyde recovered from the reaction mass or from any other source can be converted under the conditions of the process of the invention to produce benzophenone. Also produced, as later described are hydrobenzoin monotrifluoroacetate, hydrobenzoin bistrifluoroacetate and benzoin trifluoroacetate.

By the term "a stilbene" I intend to include all the compounds having the following formula, including the cis and trans isomers thereof:

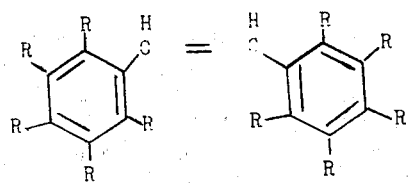

wherein each R can be selected from hydrogen, alkyl, alkoxy, or perfluoroalkyl radicals containing 1 to 4 carbon atoms,

and halogen such as fluorine, chlorine and bromine with at least 2 R radicals on each ring being hydrogen. It is understood that stilbenes with combinations of the various substituents are also suitable for use in the present oxidative process.

As solvents for use in this invention halogenated aromatic compounds, benzene, and carboxylic acids are suitable. For example, aryl chlorides and aryl fluorides are suitable and include chlorobenzene, fluorobenzene, orthodichlorobenzene, 1,2,4-trichlorobenzene, 1,3,5-trichlorobenzene, meta-difluorobenzene, para-dichlorobenzene, 1-chloronaphthalene, 1-fluoronaphthalene, metadichlorobenzene, and the like or mixtures thereof. Suitable carboxylic acid solvents are described by the formula $RCO_2H$ wherein R is alkyl containing 1 to 4 carbon atoms. Suitable solvents include acetic acid, n-butyric acid, propionic acid, and the like or mixtures thereof.

Suitable catalysts for the inventive process are described by the formula

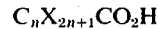

$$C_nX_{2n+1}CO_2H$$

wherein X is fluorine or chlorine and $n$ can be 1–10. Suitable catalysts include trifluoroacetic acid, perfluorobutyric acid, perfluorooctanoic acid and the like or mixtures thereof. Presently, trifluoroacetic acid is preferred. Other halogenated carboxylic acids such as trichloroacetic acid can also be used in the present process.

Suitable cocatalysts for use in the inventive process are selected from the group of transition metals consisting of iron, copper, manganese, cobalt, chromium, vanadium, cerium, and titanium. Commercially available naphthenates or acetylacetonates of the above transition metals generally are used as a matter of convenience in the practice of this invention but other compositions containing the above transition metals or mixtures thereof can also be used.

In the practice of the present invention, if a carboxylic acid solvent such as acetic acid is used, the use of a catalyst and cocatalyst is optional. If a haloaromatic solvent such as chlorobenzene is used, a catalyst is required and a cocatalyst is optional.

In the following table several of the various embodiments of the invention are summarized.

TABLE I

Systems for the Oxidation of Stilbene* with $O_2$

| Embodiment | Solvent | Catalyst | Cocatalyst | Reaction Temperature °F | Runs |
|---|---|---|---|---|---|
| I | Acetic Acid | None | None | 350 | 1,2 |
| II | Acetic Acid | Trifluoro-acetic Acid | None | 200 | 3 |
| III | Chlorobenzene | Trifluoro-acetic Acid | None | 350 | 5–9 |
| IV | Chlorobenzene | Trifluoro-acetic Acid | Transition Metal | 350 | 11,12 |

*Benzophenone and benzaldehyde are produced in significant quantities in the above runs. Benzoic acid was produced in relatively small amounts as shown by its isolation from two runs (see footnote to Table II). Diphenylacetaldehyde was detectable in significant amounts in lower temperature runs, i.e., at temperatures <200°F (see Table IV).

In accordance with the present invention, embodiments I–IV of Table I were carried out by a general procedure which involved charging the reactants to a glass-lined titanium autoclave, pressuring to a desired level with oxygen, and heating the system at a desired temperature for a specified time. Reaction was evidenced by the decrease in oxygen pressure as the stilbene was oxidized. It is to be noted that the $O_2$ pressure reported herein was the initial pressure reading. As the oxygen pressure decreased during a run, the system was not repressured to maintain the initial oxygen pressure reading. The autoclave was cooled to room temperature and the mixture distilled to isolate the products. Alternatively, in a number of the experimental runs, the products were analyzed by glc after the addition of an internal standard. Example I below is a typical run and specifically illustrates embodiment IV of Table I. (See Run 11 in Table II).

EXAMPLE I

A mixture of trans-stilbene (10 g, $5.55 \times 10^{-2}$ mole), cobalt(II) acetylacetonate (5 mg), chlorobenzene (75 ml), and trifluoroacetic acid (1.5 g) was placed in a glass lined titanium Parr Rocking Bomb and the system was pressured to 100 psig oxygen at room temperature. The system was heated to 350°F and maintained at this temperature for a period of two hours. The bomb was cooled, vented, and the product mixture was analyzed by glc after the addition of 2.00 g methyl benzoate as an internal standard. According to the glc results, conversion of stilbene was about 86% and the % efficiency to benzaldehyde and benzophenone, respectively, was 34% and 35.3%. The % efficiency was based on the following assumptions:

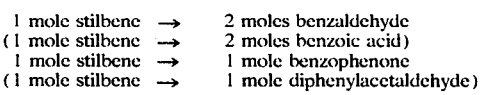

The results of runs representative of embodiments I, II, III, and IV are disclosed in Table II.

In Table II Run 4 indicates that embodiment II is not operable for stilbene oxidation at 150°F in a reaction period of 4 hours.

Gas-liquid chromatography (glc) analyses were carried out on a 9 ft. 20% Apiezon L column programmed from 100°C to about 250°C. The detector was maintained at 300°C and the sampler was 250°C. The percent efficiency is based on the relative size of the various peaks compared to the size of the peak due to the presence of the internal standard. As is well known in the art, the identity of a component represented by a glc peak is established by condensing the effluent corresponding to each peak on its exit from the glc instrument. The effluent so obtained is then characterized by appropriate techniques such as elemental, nuclear magnetic resonance (NMR), infrared, ultraviolet and mass spectroscopic analyses and melting or boiling point. An illustrative run is described in Example II (See Run 3 in Table II).

EXAMPLE II

This reaction was carried out in the same manner as described in Example I with the following charge:

TABLE II

| Embodiment | Run No. | T(°F) | $O_2$ psig | Time Hrs. | % Stilbene Conversion | % Efficiency* $\phi$CHO | % Efficiency* $\phi_2$CO | ml $CF_3CO_2H$ | ml $\phi$Cl | ml HOAC |
|---|---|---|---|---|---|---|---|---|---|---|
| I | 1 | 350 | 200 | 3 | 78.6 | 28 | 31 | 0 | 0 | 75 |
|  | 2 | 350 | 100 | 0.66 | 68 | 26.4 | 31.2 | 0 | 0 | 75 |
| II | 3 | 200 | 100 | 6 | 80.4 | 12.7 | 18.4 | 5.0 | 0 | 75 |
|  | 4 | 150 | 100 | 4 | 0 | 0 | 0 | 5.0 | 0 | 75 |
| III | 5 | 350 | 50 | 2 | 40.3 | 27.2 | 46 | 1.0 | 75 | 0 |
|  | 6 | 350 | 100 | 3 | 6.7 | 51.3 | 56.8 | 0.1 | 75 | 0 |
|  | 7 | 350 | 100 | 2 | 54 | 24 | 39 | 0.5 | 75 | 0 |
|  | 8 | 350 | 50 | 2 | 36 | 39 | 47 | 0.5 | 75 | 0 |
|  | 9 | 350 | 50 | 2 | 41.5 | 36.5 | 47.8 | 0.5 | 75 | 0 |
|  | 10 | 350 | 100 | 2 | 52.4 | 22.5 | 40.2 | 1.0 | 75 | 0 |
| IV** | 11 | 350 | 100 | 2 | 85.8 | 34 | 35.3 | 1.5 | 75 | 0 |
|  | 12 | 350 | 100 | 2 | 93 | 32.2 | 30.0 | 1.0 | 75 | 0 |

*As defined above.
**Cobalt(II) acetylacetonate and vanadium naphthenate, respectively, were used in runs 11 and 12.

trans-stilbene (10 g, 5.55 × 10$^{-2}$ mole), glacial acetic acid (75 ml) and trifluoroacetic acid (5.0 ml). The system was pressured to 100 psig O$_2$, heated to 200°F, and maintained at this temperature for a period of 6 hours. The reactor was cooled, vented and stripped of volatiles on a rotary evaporator. The residue was taken up in chlorobenzene and methylbenzoate was added as an internal standard before analyzing the product mixture by glc analysis. According to the glc analysis, the conversion of stilbene was 80.4% with a % efficiency, respectively, to benzaldehyde and benzophenone of 12.7% and 18.4%. The peak corresponding to benzophenone was condensed on its exit from the glc instrument and analyzed by infrared analysis. The sample was thus shown to be mostly benzophenone contaminated with about 10% diphenylacetaldehyde.

In order to demonstrate the oxidation of stilbene over a range of temperatures from 300°F to 100°F, several runs were carried out using the % efficiency to benzaldehyde as a measure of the oxidation of stilbene that was occurring. The results of these runs are shown in Table III.

TABLE III

| Embodiment | Run No. | T(°F) | O$_2$ psig | Time (hrs.) | % Stilbene Conversion | % Efficiency $\phi$CHO |
|---|---|---|---|---|---|---|
| III | 14 | 300 | 100 | 1 | 41.1 | 43.4 |
|  | 15 | 250 | 100 | 4 | 25.2 | 55.7 |
|  | 16 | 200 | 100 | 6 | 33.5 | 51.6 |
|  | 17 | 150 | 100 | 7 | 28 | 56 |
|  | 18 | 100 | 100 | 24 | 20.2 | 55.4 |
| IV | 19 | 122 | 47.5 | 3.33 | 84 | 45 |
|  | 20 | 122 | 47.6 | 4.5 | 40.8 | 49.6 |

*Oxidation of Stilbene to Benzaldehyde*

*In all runs 1.0 ml CF$_3$CO$_2$H and 75 ml $\phi$Cl were used except in runs 19 and 20 in which 50 ml $\phi$Cl were used. The catalysts in runs 19 and 20 were, respectively, perfluorobutyric acid and perfluorooctanic acid with cocatlyst vanadium naphthenate.

Example III is given below to demonstrate that a charge of diphenylacetaldehyde, chlorobenzene, and trifluoroacetic acid in the present inventive oxidative process yields a mixture containing benzophenone.

EXAMPLE III

This reaction was carried out in the same apparatus as used in Example I employing a charge of chlorobenzene (75 ml), trifluoroacetic acid (1.0 ml), and diphenylacetaldehyde (5 g). The system was pressured to 100 psig O$_2$, heated to 350°F, and maintained at this temperature for a period of 3 hours. The reactor was cooled, vented, and volatiles were stripped on a rotary evaporator. Distillation of the residue gave 3.63 g of a material which by infrared analysis was shown to be benzophenone in greater than 90% purity. A portion of this material was recrystallized from methanol to give a sample which exhibited an infrared spectrum which was identical to that of an authentic sample of benzophenone.

The following components were identified in product mixtures arising by the use of the present inventive process: hydrobenzoin monotrifluoroacetate, hydrobenzoin bis(trifluoroacetate), and benzoin trifluoroacetate. The presence of these components was verified as discussed below in Examples IV, V and VI.

EXAMPLE IV

In order to prepare a sample of a monotrifluoroacetate of hydrobenzoin, five product mixtures obtained by practicing embodiment III of the present invention were combined and worked up as follows. A monotrifluoroacetate of hydrobenzoin was isolated by silica gel chromatography after chlorobenzene, trifluoroacetic acid, and benzaldehyde had been removed by vacuum distillation. A monotrifluoroacetate (m.p. 102.5°–105°C) was isolated from the silica gel column by benzene elution and was characterized by nuclear magnetic resonance and elemental analyses. Elemental analysis calculated for C$_{16}$H$_{13}$F$_3$O$_3$:

|  | %C | %H |
|---|---|---|
| Calc'd | 61.94 | 4.22 |
| Found | 61.70 | 4.06 |

A sample of a monotrifluoroacetate of hydrobenzoin was prepared by the reaction of stilbene oxide with trifluoroacetic acid. The sample was characterized by elemental analysis. Elemental analysis calculated for C$_{16}$H$_{13}$F$_3$O$_3$:

|  | %C | %H | %F |
|---|---|---|---|
| Calc'd | 61.94 | 4.22 | 18.37 |
| Found | 62.0 | 4.13 | 18.2 |

An additional sample of a hydrobenzoin monotrifluoroacetate was prepared by the reaction of trifluoroacetic anhydride and hydrobenzoin. The nuclear magnetic resonance and infrared spectral properties of the three samples of hydrobenzoin monotrifluoroacetate were identical.

The sample of a monotrifluoroacetate of hydrobenzoin was isolated from the combination of five runs which used a charge of stilbene, chlorobenzene, and trifluoroacetic acid. These runs were carried out in a glass reaction bulb attached to an oxygen reservoir by means of a stainless steel line. After charging the reactants, the bulb was attached to the stainless steel line, placed in a 50°C bath, purged quickly three times with oxygen, and then pressured to about 45 psig O$_2$. Reaction times for these five runs varied from 360 to 1825 minutes.

EXAMPLE V

A sample of hydrobenzoin bis(trifluoroacetate) was isolated from a run which used a charge of stilbene, chlorobenzene, and trifluoroacetic acid (Embodiment III). This run was carried out in the same apparatus used in Example I. The initial oxygen pressure was 100 psig, and the reaction was carried out at 150°F for a period of 39 hours and 28 minutes. The reaction mixture was cooled, vented, and stripped of volatiles on a rotary evaporator. The presence of the bis(trifluoroacetate) ester of hydrobenzoin was established by using glc analysis on an Apiezon L column. The ester sample was isolated by condensation of the glc effluent and melted at 91°–93°C. The ester was shown to be the bis(trifluoroacetate) of hydrobenzoin by the fact that the spectral properties (both infrared and nuclear magnetic resonance) were identical to those of a bis(trifluoroacetate) of hydrobenzoin prepared below. A sample of the bis(trifluoroacetate) of hydrobenzoin was prepared by the reaction of stilbene glycol with trifluoroacetic anhydride. This product melted at 94°–95°C and was characterized by elemental analysis. Elemental analysis calculated for $C_{18}H_{12}F_6O_4$:

|  | %C | %H | %F |
|---|---|---|---|
| Calc'd | 53.2 | 2.98 | 28.1 |
| Found | 53.5 | 3.05 | 27.2 |

EXAMPLE VI

A sample of the trifluoroacetate of benzoin was isolated from a combination of three runs carried out in accordance with Embodiment III of the present invention. These runs were carried out in the glass reactor used in Example IV under approximately the same temperature (50°C) and oxygen pressure (48 psig $O_2$). Reaction times varied from 270 to 430 minutes. The reaction charge consisted of stilbene, chlorobenzene, and trifluoroacetic acid. Isolation involved distillation of the volatiles in vacuo followed by elution column chromatography to separate out a component which was identified by infrared analysis as benzoin trifluoroacetate.

Injection of an authentic sample of a monotrifluoroacetate of hydrobenzoin into the glc instrument gave rise to a peak corresponding to diphenylacetaldehyde. The diphenylacetaldehyde peak was trapped at the exit of the glc instrument and its structure was verified by infrared analysis.

The reaction parameters suitable for the oxidation of stilbene in accordance with the present process are discussed below.

|  | Operable | Preferred for the Production of $\phi_2 CO$ |
|---|---|---|
| (a) Temperature (°F) | 50–600 | 200–400 |

It is to be noted that small amounts of benzophenone are produced at temperatures well below 200°F. It is also to be noted that the detectable quantity of diphenylacetaldehyde by glc analysis is greatly diminished at temperatures above 200°F. Generally, runs directed toward benzophenone production should be carried out at temperatures of 350°F or higher.

In the practice of the present invention, it is to be noted that safety considerations dictate against the use of the upper end of the temperature range coupled with the upper limit of the oxygen pressure range. In general, the use of lower temperatures will require longer reaction periods to attain a certain conversion at constant oxygen pressure and constant molar ratio of stilbene to trifluoroacetic acid. (e) Metal/stilbene ratio The transition metals in the present process effectively promote the rate of stilbene oxidation in amounts as low as 0.1 part of metal per million parts of stilbene. Presently, vanadium is preferred. Higher ratios of metal to stilbene can be used as dictated by convenience and/or economics.

It will be seen from the foregoing tabulation of reaction parameters that the temperature though preferred to be elevated can be as low as 50°F at which rather small amounts of benzophenone will be produced. It will also be seen that temperature can be quite high that is well above 400° i.e. 600°F or higher but that these temperatures best results will ordinarily not be obtained. The now preferred range of temperature for the production of benzophenone is as earlier given herein namely from about 200° to about 400°F.

Also it will be seen that the oxygen pressure can be quite low albeit it is now preferred to have an elevated oxygen pressure especially when operating in batch or autoclave manner.

Reasonable variation and modification are possible within the scope of the foregoing disclosure and the appended claims to the invention the essence of which is that a stilbene is converted by oxidation with oxygen to produce benzophenone and related products, e.g., hydrobenzoin monotrifluoroacetate, hydrobenzoin bistrifluoroacetate and benzoin trifluoroacetate, in one embodiment with a catalyst, in another with a catalyst, and a cocatalyst, and preferably at an elevated temperature and under some pressure of oxygen.

I claim:

1. The oxidation of a stilbene under conditions to produce a benzophenone which comprises subjecting said stilbene dissolved in a solvent selected from carboxylic acids and halogenated aromatic compounds in the presence of a catalyst having the formula $C_nX_{2n+1}CO_2H$ wherein X is fluorine or chlorine and $n$ can be 1–10, to the action of oxygen under pressure.

2. The oxidation of a stilbene according to claim 1 under the following conditions: a temperature in a range of from about 200° to about 400°F and under a pressure of oxygen of from about 20–200 psig.

|  |  | Operable | Preferred | More Preferred |
|---|---|---|---|---|
| (b) | Reaction time | 1 min.–48 hrs. | 0.5–5 hrs. |  |
| (c) | Molar Ratio stilbene/$CF_3CO_2H$ in aryl halide solvent | 1:500 to 500:1 | 1:2 to 2:1 |  |
| (d) | Oxygen pressure (psig) | 1–500 | 20–200 | 40–200 |

3. The production of benzophenone according to claim 1 wherein the stilbene is a compound having the formula

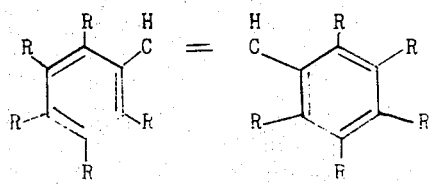

including the cis and trans isomers and wherein each R can be selected from hydrogen, alkyl, alkoxy, or perfluoroalkyl radicals containing 1 to 4 carbon atoms,

and halogen such as fluorine, chlorine and bromine with at least 2 R radicals on each ring being hydrogen.

4. A process according to claim 1 wherein a halogenated aromatic compound is employed as solvent.

5. A process according to claim 1 wherein a carboxylic acid solvent is employed.

6. A process according to claim 1 wherein an organic compound of a transition metal selected from the group consisting of iron, copper, manganese, chromium, vanadium, cobalt, cerium and titanium is employed as a cocatalyst.

7. A process according to claim 6 wherein the cocatalyst is selected from cobalt acetylacetonate and vanadium naphthanate.

8. The oxidation of trans-stilbene, according to claim 1 wherein the trans-stilbene is heated under a pressure of oxygen in the presence of trifluoroacetic acid and cobalt acetylacetonate in the presence of chlorobenzene.

9. The oxidation of stilbene according to claim 1 wherein transstilbene is oxidized under a pressure of oxygen at an elevated temperature in the presence of glacial acetic acid.

10. The oxidation of stilbene according to claim 1 wherein transstilbene is oxidized in the presence of glacial acetic acid and trifluoroacetic acid.

11. The oxidation of diphenylacetaldehyde under a pressure of oxygen to produce benzophenone in the presence of trifluoroacetic acid and, as a solvent, chlorobenzene.

* * * * *